United States Patent
Carpio et al.

(10) Patent No.: US 8,199,776 B2
(45) Date of Patent: Jun. 12, 2012

(54) SYSTEM AND METHOD FOR EFFECTIVELY TRANSMITTING CONTENT BURSTS TO ELECTRONIC DEVICES

(75) Inventors: Fredrik Carpio, San Diego, CA (US); Nikolaos Georgis, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 985 days.

(21) Appl. No.: 12/220,858

(22) Filed: Jul. 29, 2008

(65) Prior Publication Data

US 2010/0027562 A1 Feb. 4, 2010

(51) Int. Cl.
*H04J 3/24* (2006.01)
*H04L 12/28* (2006.01)
*G06F 15/173* (2006.01)

(52) U.S. Cl. ............... 370/474; 370/230.1; 370/395.21; 370/395.43; 370/509; 709/238

(58) Field of Classification Search ....... 370/230.1–232, 370/316–330, 395.4, 473–474, 230–474, 370/200–509; 455/3.01–3.06; 705/14.39, 705/14.54, 14.64, 14.66, 14.73; 709/203–238
See application file for complete search history.

(56) References Cited

U.S. PATENT DOCUMENTS

| | | | |
|---|---|---|---|
| 4,703,475 A | 10/1987 | Dretzka et al. | |
| 5,625,877 A | 4/1997 | Dunn et al. | |
| 6,907,028 B2 | 6/2005 | Laiho et al. | |
| 7,212,551 B1 * | 5/2007 | Beshai et al. | 370/509 |
| 2002/0197998 A1 | 12/2002 | Schmidt | |
| 2004/0179486 A1 * | 9/2004 | Agarwal et al. | 370/316 |
| 2007/0008934 A1 | 1/2007 | Balasubramanian et al. | |
| 2007/0074264 A1 | 3/2007 | Vesma et al. | |
| 2008/0313033 A1 * | 12/2008 | Guo et al. | 705/14 |
| 2009/0207859 A1 * | 8/2009 | Beshai et al. | 370/474 |

FOREIGN PATENT DOCUMENTS

WO WO2007031114 A1 3/2007

OTHER PUBLICATIONS

Wikipedia, The Free Encyclopidia, DVB-H, file://///inmufps01/redirected$/og000232/Desktop/PAS%20597/DVB-H.htm, Mar. 2008, pp. 1-4.

Alex C. Snoeren, Adaptive Inverse Multiplexing for Wide-Area Wireless Networks, Laboratory for Computer Science Massachusetts Institute of Technology, 19991205;19991205-19991209, vol. 3, Dec. 5, 1999, pp. 1665-1672, XP010373713.

* cited by examiner

*Primary Examiner* — Afsar M. Qureshi
(74) *Attorney, Agent, or Firm* — Gregory J. Koerner; Redwood Patent Law

(57) ABSTRACT

A system for supporting a burst transmission procedure includes a burst manager that divides a selected content item into individual content segments. A transmitter then transmits the content segments in a substantially concurrent manner over different corresponding transmission channels. One or more electronic devices receives and stores the transmitted content segments. A content manager of the electronic device performs a reassembly procedure to convert the content segments into the originally-transmitted content item for utilization by a device user.

18 Claims, 10 Drawing Sheets

SYSTEM AND METHOD FOR EFFECTIVELY TRANSMITTING CONTENT BURSTS TO ELECTRONIC DEVICES

BACKGROUND SECTION

1. Field of the Invention

This invention relates generally to techniques for managing electronic information, and relates more particularly to a system and method for effectively transmitting content bursts to electronic devices.

2. Description of the Background Art

Implementing effective methods for providing electronic content is a significant consideration for designers and manufacturers of contemporary electronic devices. However, effectively providing content utilized by electronic devices may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an enhanced electronic network device that effectively manages electronic content may benefit from an effective implementation because of the large amount and complexity of the digital data involved.

Due to growing demands on system resources and substantially increasing data magnitudes, it is apparent that developing new techniques for providing content to electronic devices is a matter of concern for related electronic technologies. Therefore, for all the foregoing reasons, developing effective techniques for providing content remains a significant consideration for designers, manufacturers, and users of contemporary electronic devices.

SUMMARY

In accordance with the present invention, a system for effectively transmitting content bursts to electronic devices is disclosed. In one embodiment, a content distribution system advantageously supports a burst transmission procedure that automatically provides various types of appropriate content items for utilization by device users of the electronic devices. For example, the content items may include, but are not limited to, time-dependent information such as movies, music, television programs, and audio/video clips.

In one embodiment, a burst manager of a transmitter initially identifies a selected content item for a burst transmission by utilizing any appropriate techniques. For example, the content item may be listed on a content programming schedule. The burst manager then determines currently available transmission channels on a transmit module of the transmitter. The burst manager performs a content segmentation procedure to divide the selected content item into an appropriate number of content segments corresponding to the number of available transmission channels.

In certain embodiments, the burst manager may attach segment headers to the content segments to include any relevant information. For example, the content headers may include information for subsequently reassembling the content items back into the original content item. Finally, the transmitter may utilize a transmit module to perform a content burst transmission of the content items over respective corresponding ones of the available transmission channels.

In accordance with the present invention, an electronic device utilizes a receiver to detect the content burst transmission from the transmitter. The receiver and a content manager analyze content transmission information on a primary transmission channel to identify which transmission channels are currently being utilized for performing the content burst transmission procedure. The receiver then receives and locally stores the transmitted content segments from the content burst transmission. The content manager next analyzes headers of the received content segments and performs a content reassembly procedure to produce a unified content item that corresponds to the original content item that was selected for the content burst transmission procedure.

After the burst transmission, the electronic device may then conserve significant operating power by entering a power-saving mode that turns off the receiver. In addition, because the burst transmission is of relatively short duration (as compared to a real-time transmission), the content item is less likely to be corrupted during transmission by transmission black-outs caused by an interrupted transmission path or other negative factors. Furthermore, by utilizing additional available transmission bandwidth to perform bursts of relatively shorter duration, the transmitter may advantageously utilize the additional available time for performing other appropriate tasks and functions. For at least the foregoing reasons, the present invention therefore provides an improved system and method for effectively transmitting content bursts to electronic devices.

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for system for supporting a burst transmission procedure, and includes a burst manager that divides a selected content item into individual content segments. A transmitter then transmits the content segments in a substantially concurrent manner over different corresponding transmission channels to achieve an enhanced throughput rate. One or more electronic devices receives and stores the transmitted content segments. A content manager of the electronic device performs a reassembly procedure to convert the content segments into the originally-transmitted content item for utilization by a device user.

Figure 1:
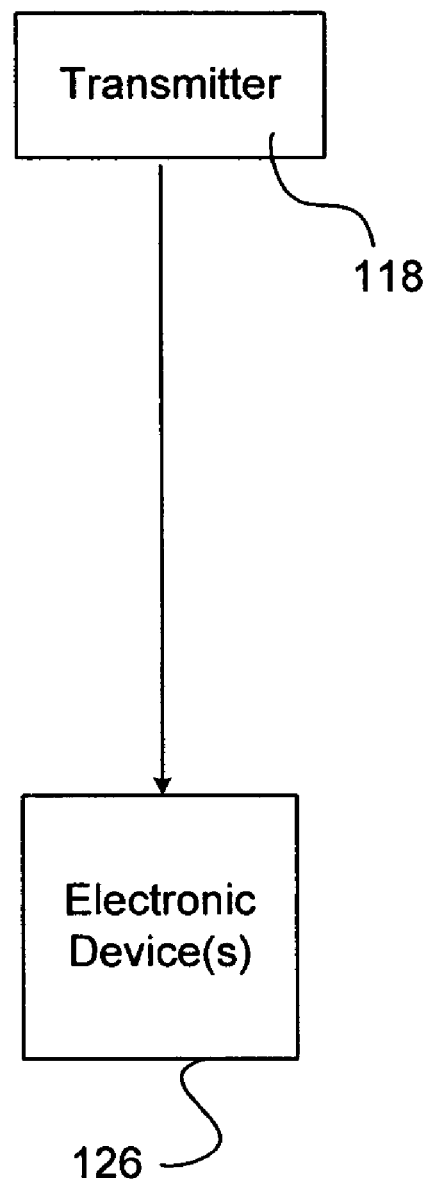
FIG. 1 is a block diagram of a content distribution system, in accordance with one embodiment of the present invention.

Referring now to FIG. 1, a block diagram of a content distribution system 110 is shown, in accordance with one embodiment of the present invention. In the FIG. 1 embodiment, content distribution system 110 may include, but is not limited to, a transmitter 118 and one or mores electronic devices 126. In alternate embodiments, content distribution system 110 may be implemented by utilizing components and configurations in addition to, or instead of, certain of those components and configurations discussed in conjunction with the FIG. 1 embodiment. For example, for purposes of illustration, a single electronic device 126 is shown in FIG. 1. However, in actual practice, principles of the disclosed invention may readily be performed concurrently in conjunction with any number of different electronic devices 126.

In accordance with the present invention, content distribution system 110 advantageously supports a burst transmission procedure that automatically provides transmission bursts of various types of appropriate content items for utilization by a device user of electronic device 126. For example, in certain embodiments the content items may include time-dependent information that is typically reproduced by electronic devices 126 in accordance with a predetermined clock.

In certain embodiments, transmitter 118 automatically provides appropriate content items to one or more electronic devices 126 by utilizing transmission bursts that transfer the content items with transmission times that are less than the normal transmission or real-time playing durations of the content items. For example, consider a situation in which a transmitter has a maximum transmission capability to transfer 20 Megabits per second (Mbs) of content, but a given content item would normally require only 5 Mbs for the transmitter to transfer the content item using a conventional transfer rate for real-time display by an electronic device.

The present invention proposes to transmit the content item in a burst transmission that utilizes all 20 Mbs of the transmission bandwidth. In such a scenario, transmitter 118 could then complete the burst transmission of the content item in one-fourth of the conventional transfer time. After the burst transmission, electronic device 126 may then conserve significant operating power by then entering a power-saving mode. In addition, because the burst transmission is relatively short (compared to a real-time transmission), the content item is less likely to be corrupted during transmission by transmission black-outs caused by an interrupted transmission path or other factors. Furthermore, by utilizing additional transmission bandwidth to perform bursts of relatively shorter duration, transmitter 118 may advantageously utilize the additional available time for performing other appropriate tasks and functions. Further details regarding the implementation and utilization of the FIG. 1 content distribution system 110 are discussed below in conjunction with FIGS. 2-10.

Figure 2:
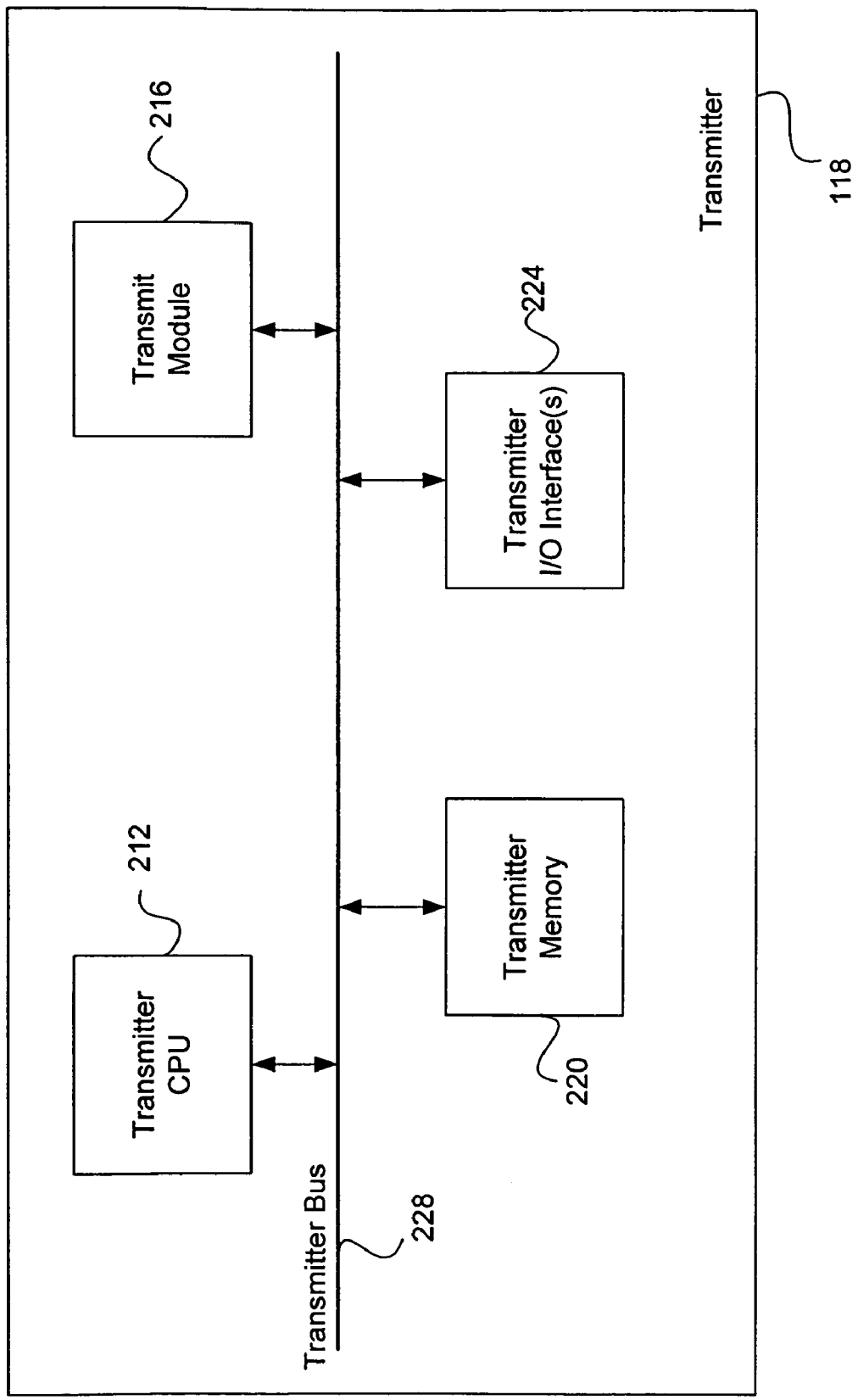
FIG. 2 is a block diagram for one embodiment of the transmitter of FIG. 1, in accordance with the present invention.

Referring now to FIG. 2, a block diagram for one embodiment of the FIG. 1 transmitter 118 is shown, in accordance with the present invention. In the FIG. 2 embodiment, transmitter 118 includes, but is not limited to, a transmitter central processing unit (transmitter CPU) 212, a transmit module 216, a transmitter memory 220, and one or more transmitter input/output interface(s) (transmitter I/O interface(s)) 224. The foregoing components of transmitter 118 may be coupled to, and communicate through, a transmitter bus 228. In alternate embodiments, transmitter 118 may alternately be implemented using components and configurations in addition to, or instead of, certain of those components and configurations discussed in conjunction with the FIG. 2 embodiment.

In the FIG. 2 embodiment, transmitter CPU 212 may be implemented to include any appropriate and compatible microprocessor device that preferably executes software instructions to thereby control and manage the operation of transmitter 118. The FIG. 2 transmitter 118 may utilize transmit module 216 to send electronic information to one or more electronic devices 126 (FIG. 1) by utilizing any effective type of wireless or wired communication techniques. For example, in certain embodiments, transmitter 118 may include a commercial television broadcast transmitter.

In the FIG. 2 embodiment, transmitter memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of transmitter memory 220 are further discussed below in conjunction with FIG. 3.

In the FIG. 2 embodiment, transmitter I/O interface(s) 224 may include one or more input and/or output interfaces to receive and/or transmit any required types of information by transmitter 118. Transmitter I/O interface(s) 224 may include one or more means for allowing a transmitter user to communicate with transmitter 118. The implementation and utilization of transmitter 118 is further discussed below in conjunction with FIGS. 3-4 and 9.

Figure 3:
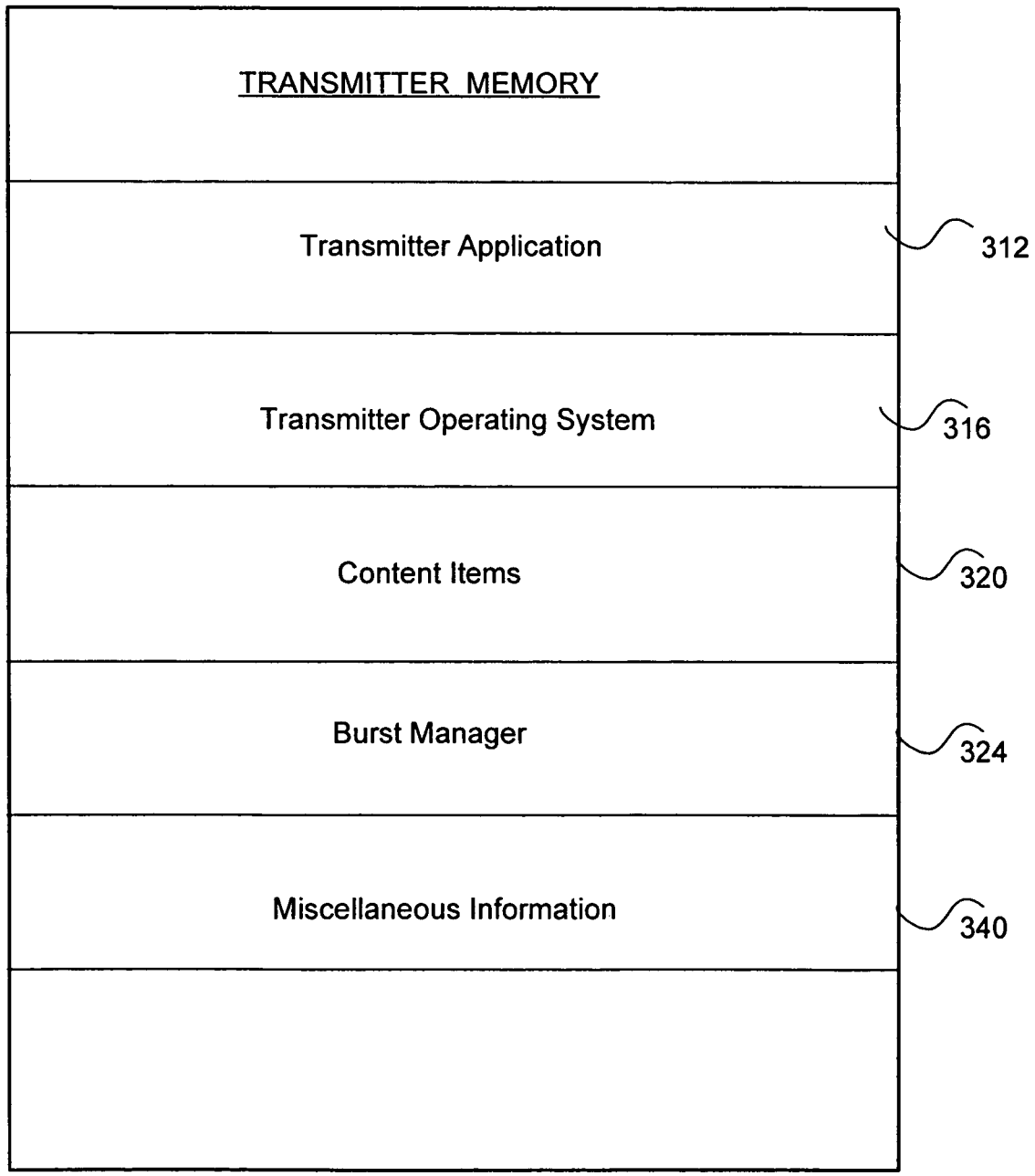
FIG. 3 is a block diagram for one embodiment of the transmitter memory of FIG. 2, in accordance with the present invention.

Referring now to FIG. 3, a block diagram for one embodiment of the FIG. 2 transmitter memory 220 is shown, in accordance with the present invention. In the FIG. 3 embodiment, transmitter memory 220 may include, but is not limited to, a transmitter application 312, a transmitter operating system 316, one or more content items 320, a burst manager 324, and miscellaneous information 340. In alternate embodiments, transmitter memory 220 may include various other components and functionalities in addition to, or instead of, certain those components and functionalities discussed in conjunction with the FIG. 3 embodiment.

In the FIG. 3 embodiment, transmitter application 312 may include program instructions that are preferably executed by transmitter CPU 212 (FIG. 2) to perform various functions and operations for transmitter 118. The particular nature and functionality of transmitter application 312 typically varies depending upon factors such as the specific type and particular functionality of the corresponding transmitter 118. Transmitter operating system 316 may perform various low-level functions for transmitter 118.

In the FIG. 3 embodiment, content database 320 may include any appropriate type of content items or other information received by transmitter application 312 from content provider 114 (FIG. 1) or other appropriate entity. For example, in certain embodiments, content items 320 may include, but are not limited to, any types of entertainment programming, movies, video data, audio data, digital photographs, still image data, graphics, web pages, program guide information, and various types of software programs, etc.

In the FIG. 3 embodiment, burst manager 324 may be utilized to coordinate content burst transmission procedures, in accordance with the present invention. In the FIG. 3 embodiment, miscellaneous information 340 may include any appropriate information or data that is required by transmitter 118. Additional details regarding the operation of burst manager 324 are further discussed below in conjunction with FIG. 9.

Figure 4:
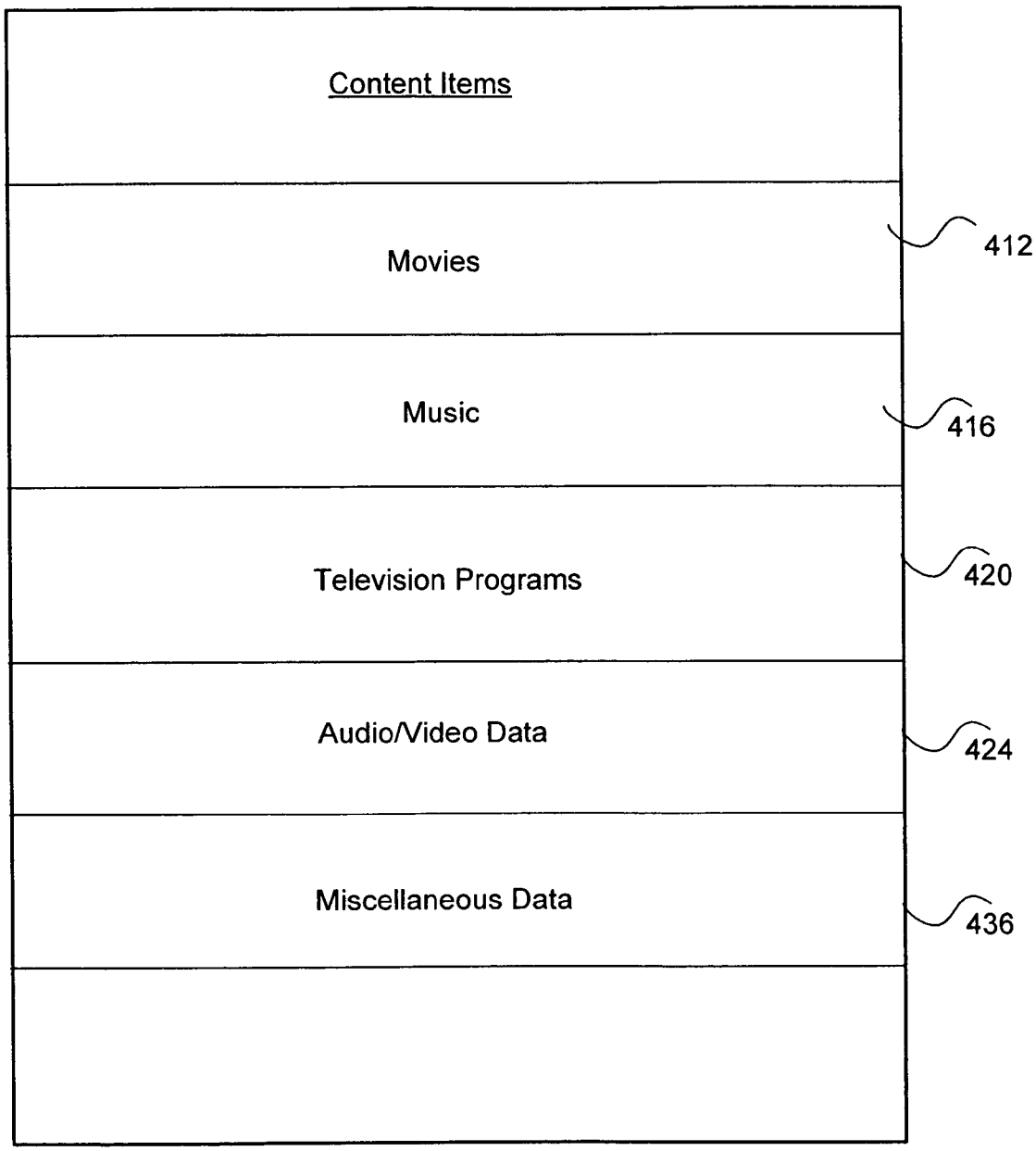
FIG. 4 is a block diagram for one embodiment of the content items of FIG. 3, in accordance with the present invention.

Referring now to FIG. 4, a block diagram for one embodiment of the FIG. 3 content items 320 is shown, in accordance with the present invention. In the FIG. 4 embodiment, content items 320 include, but are not limited to, movies 412, music 416, television programs 420, audio/video data 424, and miscellaneous data 436. In the FIG. 4 embodiment, content items 320 are presented for purposes of illustration. In alternate embodiments, transmitter 118 may provide content items 320 that include elements and information in addition to, or instead of, certain of those elements and information discussed in conjunction with the FIG. 4 embodiment.

In the FIG. 4 embodiment, movies 412, music 416, television programs 420, and audio/video data 424 may include various types of electronic information from any appropriate data source(s). In certain embodiments, certain of content items 320 are intended to be presented on electronic device 126 in an uninterrupted manner at a specific speed (time-dependent). Miscellaneous data 436 may include any additional information for utilization by electronic device 126 The transmission and reception of content items 320 is further discussed below in conjunction with FIGS. 9-10.

Figure 5:
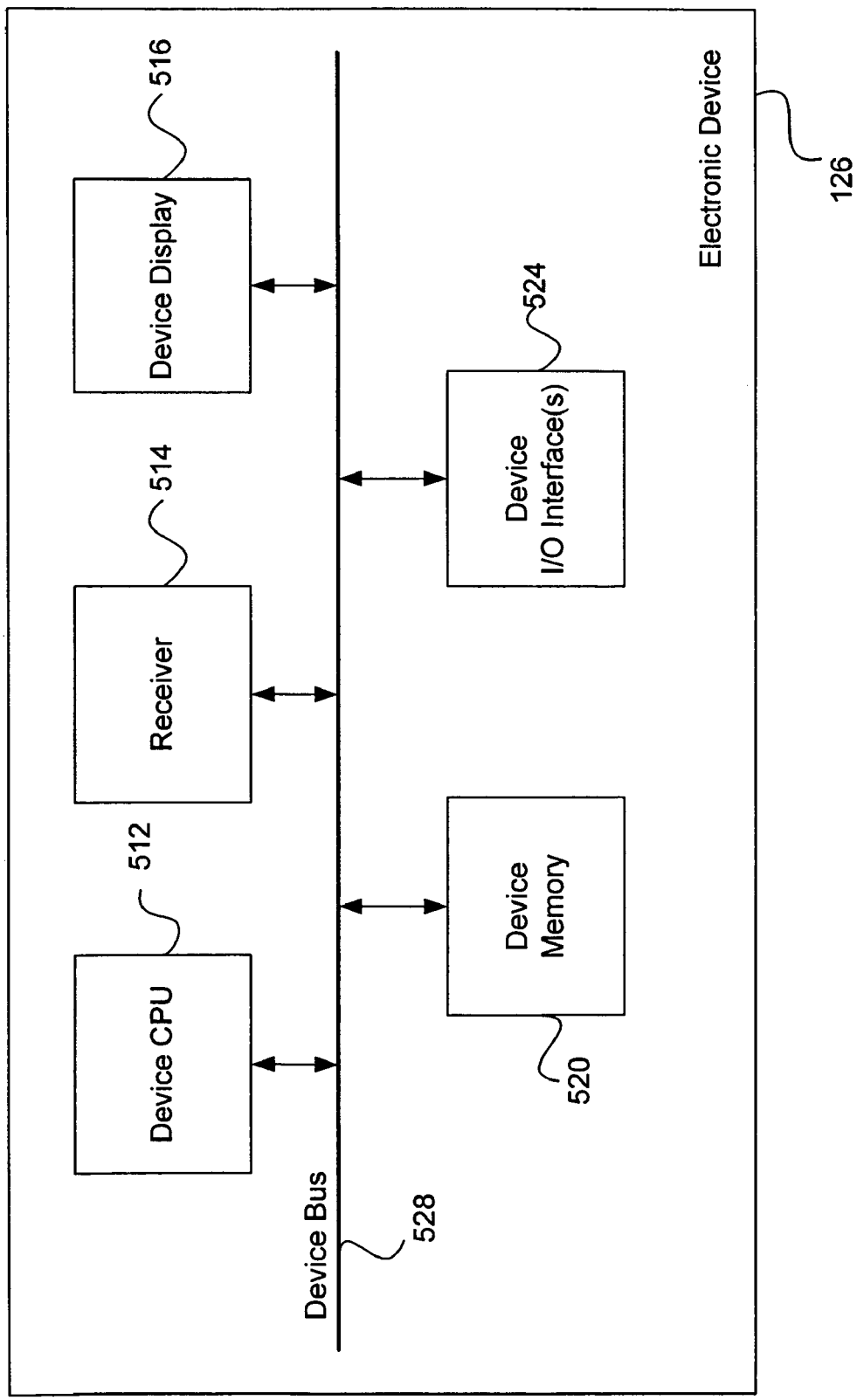
FIG. 5 is a block diagram for one embodiment of the electronic device from FIG. 1, in accordance with the present invention.

Referring now to FIG. 5, a block diagram for one embodiment of the FIG. 1 electronic device 126 is shown, in accordance with the present invention. In the FIG. 5 embodiment, electronic device 126 may include, but is not limited to, a device central processing unit (device CPU) 512, a receiver 514, a device display 516, a device memory 520, and one or more device input/output interface(s) (device I/O interface(s)) 524. The foregoing components of electronic device 126 may be coupled to, and communicate through, a device bus 528.

In alternate embodiments, electronic device 126 may readily be implemented using various components and configurations in addition to, or instead of, certain of those components and configurations discussed in conjunction with the FIG. 5 embodiment. Furthermore, in the FIG. 5 embodiment, electronic device 126 may be implemented as any type of appropriate electronic device. For example, in certain embodiments, electronic device 126 may be implemented as any type of stationary or portable electronic device, such as a personal computer, a cellular telephone, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of electronic devices 126. In the FIG. 5 embodiment, receiver 514 may include any appropriate means for receiving content items and other information from transmitter 118 (FIG. 1). In certain embodiments, receiver 514 is capable of receiving multiple transmission channels simultaneously from transmitter 118.

The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by electronic device 126. Device I/O interface(s) 524 may include one or more means for allowing a device user to communicate with other entities in content distribution system 110 (FIG. 1). For example, the foregoing means may include a keyboard device, a wireless remote-control device, a speech-recognition module with corresponding microphone, a graphical user interface with touch-screen capability, a hand-held device controller unit, or a selection button array mounted externally on electronic device 126. The implementation and utilization of electronic device 126 are further discussed below in conjunction with FIGS. 6 and 10.

Figure 6:
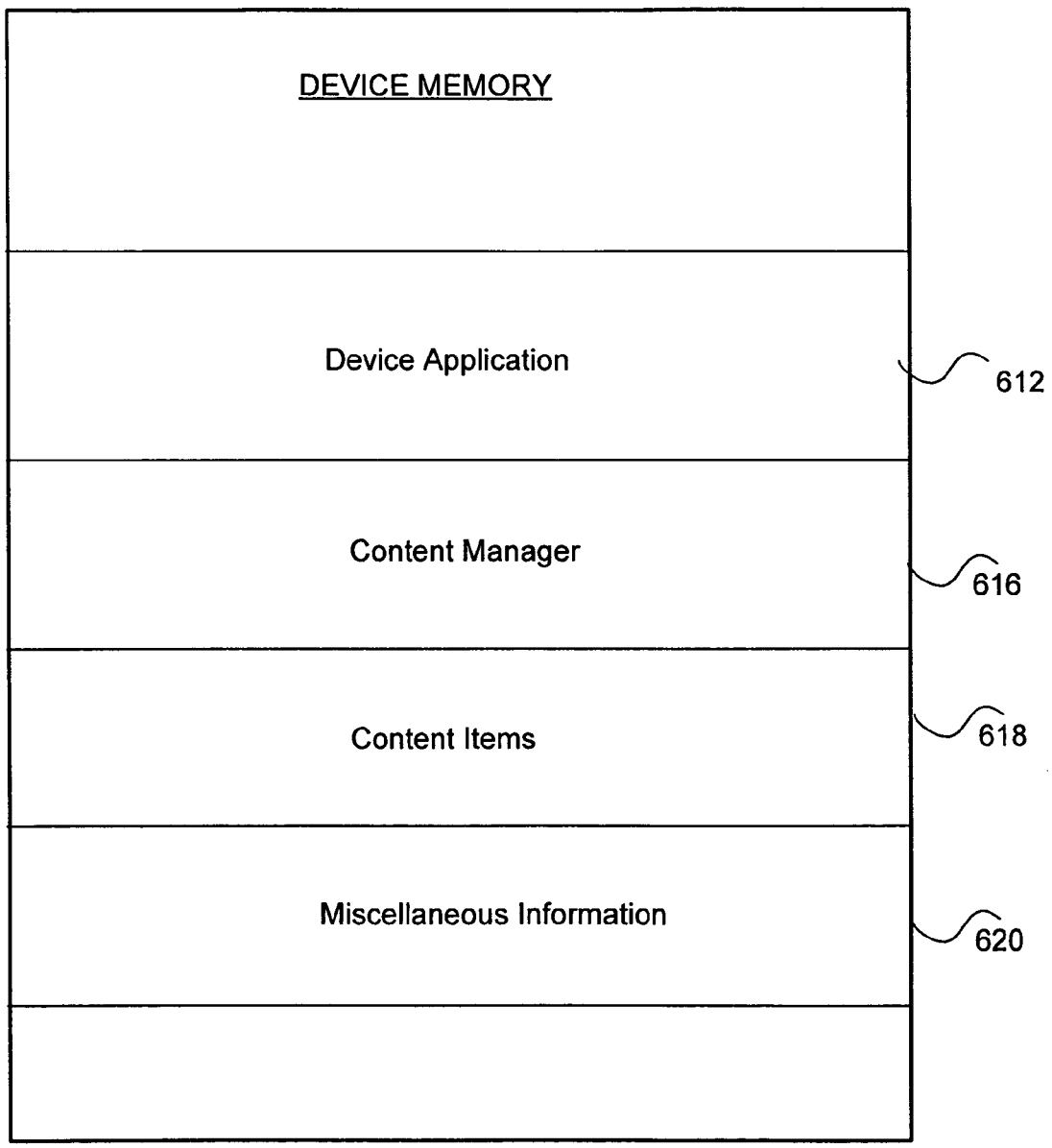
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a content manager 616, content items 618, and miscellaneous information 620. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a electronic device 126. The particular nature and functionality of device application 612 typically varies depending upon factors such as the specific type and particular functionality of the corresponding electronic device 126.

In the FIG. 6 embodiment, content manager 616 may perform appropriate procedures for receiving and managing content items by utilizing any appropriate techniques. For example, content manager may perform content download procedures to automatically receive, evaluate, reassemble, update, and locally store content items 320 from transmitter 118 as content items 618. The utilization and operation of electronic device 126 is further discussed below in conjunction with FIG. 10.

Figure 7:
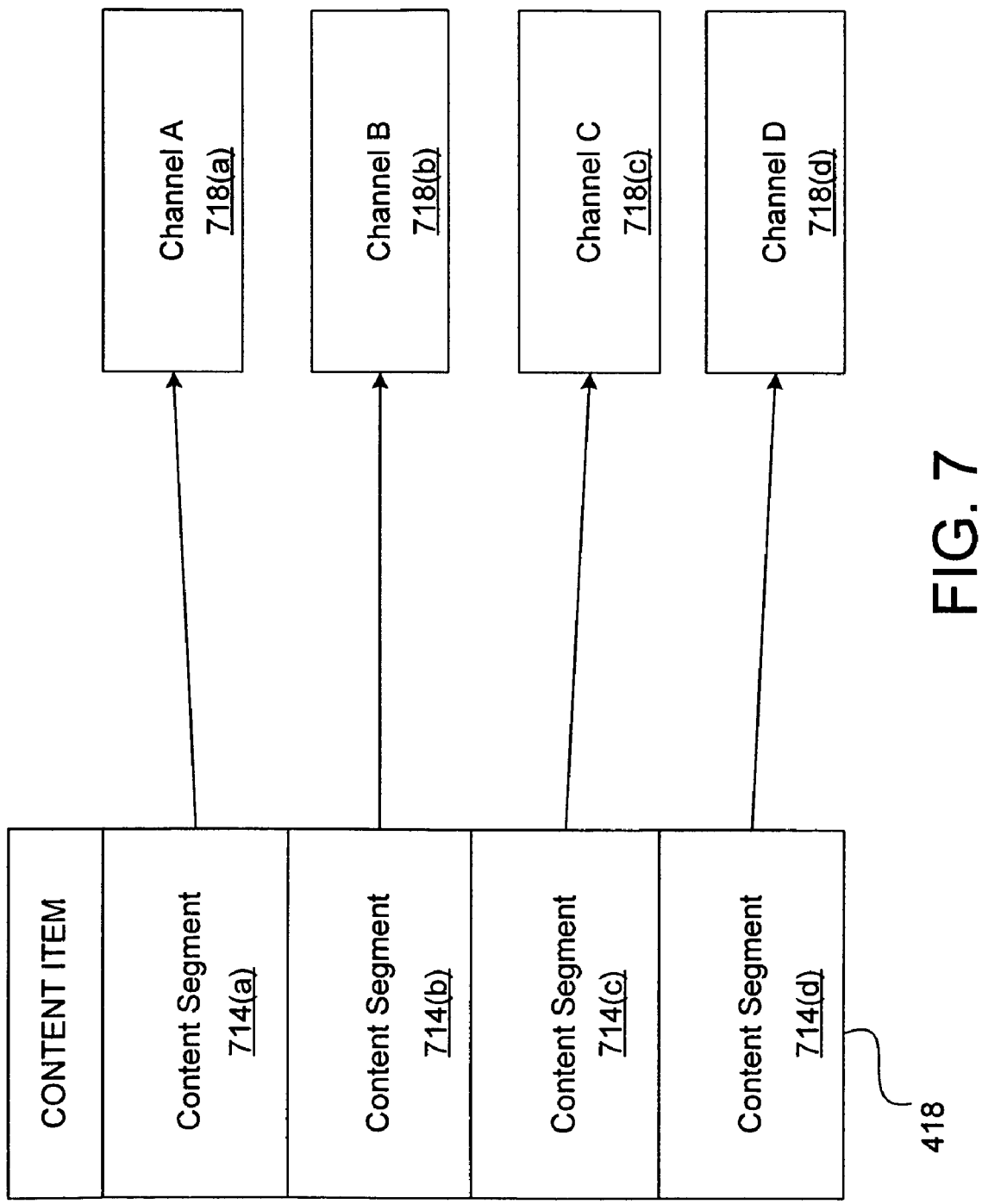
FIG. 7 is a diagram illustrating one embodiment of a burst transmission procedure, in accordance with the present invention.

Referring now to FIG. 7, a diagram illustrating one embodiment of a burst transmission procedure is shown, in accordance with the present invention. The FIG. 7 embodiment is presented for purposes of illustration, and in alternate embodiments, the present invention may perform burst transmission procedures that include other elements, configurations, and techniques in addition to, or instead of, certain of those elements, configurations, and techniques discussed in conjunction with the FIG. 7 embodiment.

In the FIG. 7 embodiment, a burst manager 324 of transmitter 118 determines how many transmission channels 718 are currently available for transmitting a content burst. Burst manager 324 then divides a selected content item 418 into a number of content segments 714 that matches the number of available channels 718. For purposes of illustration, FIG. 7 shows four content segments 714(a-d), however any appropriate number of segments 714 may be utilized.

A transmit module 216 (FIG. 2) of transmitter 118 may then concurrently transmit the content segments 714 over respective channels 718 to one or more electronic devices 126. In certain embodiments, one of the channels 718 is designated as a primary channel over which burst manager 324 transmits various types of control information. For example, the primary channel may include channel information that specifies which particular channels 714 of transmitter 118 are utilized for a given content burst. Further details regarding the creation and transmission of content segments 714 are further discussed below in conjunction with FIG. 9.

Figure 8:
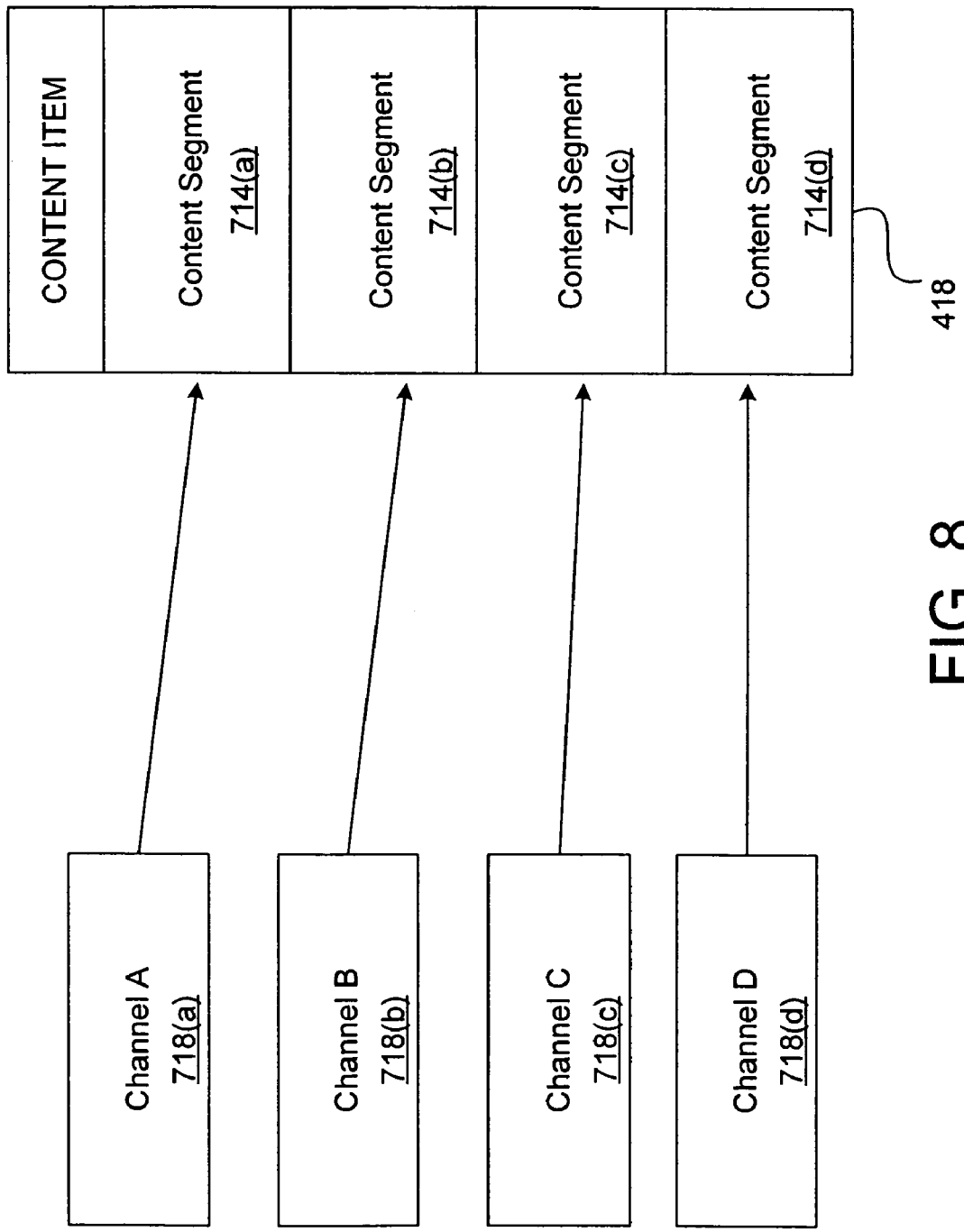
FIG. 8 is a diagram illustrating one embodiment of a burst reception procedure, in accordance with the present invention.

Referring now to FIG. 8, a diagram illustrating one embodiment of a burst reception procedure is shown, in accordance with the present invention. The FIG. 8 embodiment is presented for purposes of illustration, and in alternate embodiments, the present invention may perform burst reception procedures that include other elements, configurations, and techniques in addition to, or instead of, certain of those elements, configurations, and techniques discussed in conjunction with the FIG. 8 embodiment.

In the FIG. 8 embodiment, a content manager 616 of electronic device 126 determines how which transmission channels 718 from transmitter 118 are currently being utilized for transmitting a content burst. For example, content manager 616 may analyze channel information on a pre-determined primary channel 714. A receiver 514 of the electronic device 126 then receives and stores transmitted the content segments 718. For purposes of illustration, FIG. 8 shows four content segments 714(a-d), however any appropriate number of segments 714 may be utilized.

The content manager 616 may then perform a reassembly procedure to recombine the content segments 714 into the original content item 418 by utilizing any effective techniques. For example, content manager 616 may analyze content segment headers or content item time-code information. In certain embodiments, content manager 616 and receiver 514 may detect a change in the transmission channels utilized for transmitting the content items 618, and may responsively continue to receive the content items 618 on new or different transmission channels. Further details regarding the reception of content segments 714 are further discussed below in conjunction with FIG. 10.

Figure 9:
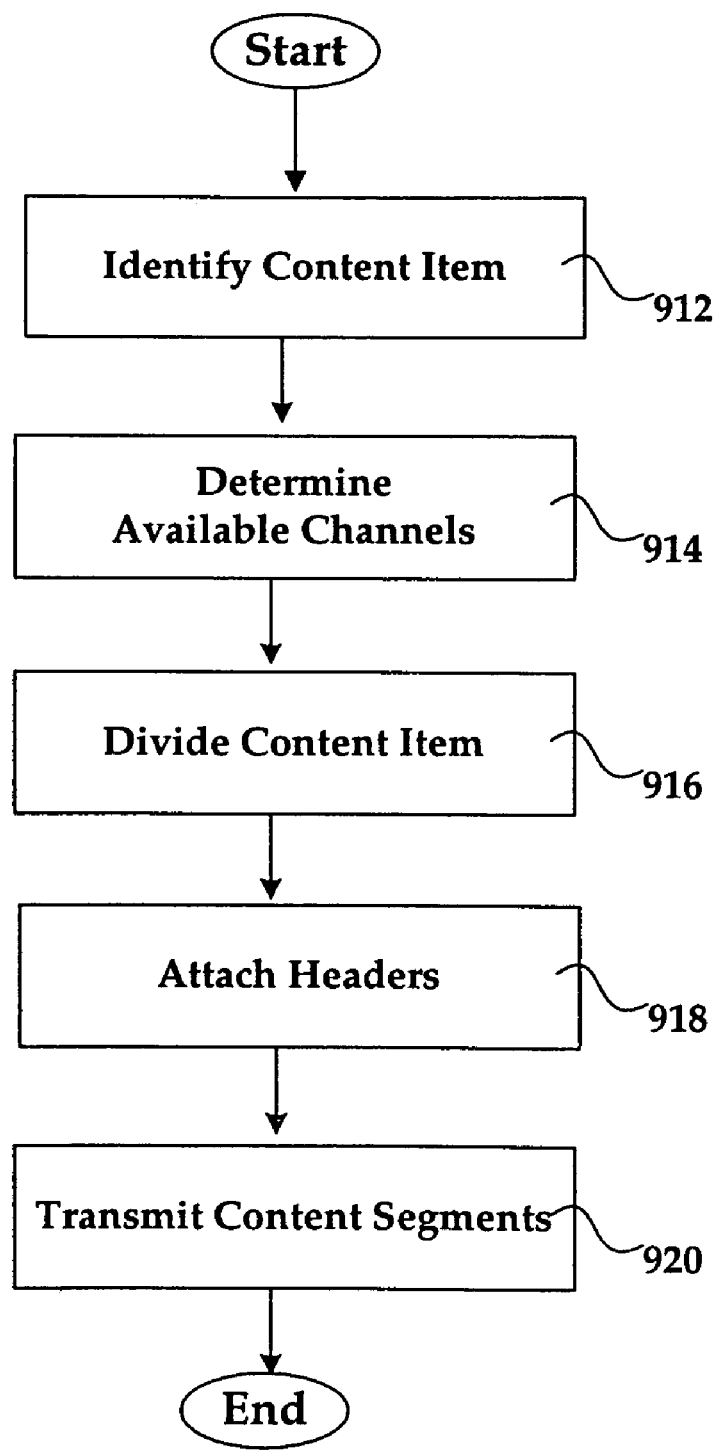
FIG. 9 is a flowchart of method steps for performing a burst transmission procedure, in accordance with one embodiment of the present invention.

Referring now to FIG. 9, a flowchart of method steps for performing a burst transmission procedure is shown, in accordance with one embodiment of the present invention. The FIG. 9 flowchart is presented for purposes of illustration, and in alternate embodiments, the present invention may utilize steps and sequences other than those steps and sequences discussed in conjunction with the FIG. 9 embodiment.

In the FIG. 9 embodiment, in step 912, a burst manager 324 of a transmitter 118 (FIG. 1) identifies a selected content item 320 for a burst transmission by utilizing any appropriate techniques. For example, the content item 320 may be listed on a content programming schedule. In step 914, burst manager 324 then determines currently available transmission channels 818 on a transmit module 216 of transmitter 118. In step 916, burst manager 324 performs a content segmentation procedure to divide the selected content item 320 into an appropriate number of content segments 714 corresponding to the number of available transmission channels 718.

In step 918, burst manager 324 may attach segment headers to the content segments 714 to include any relevant information. For example, the content headers may include information for subsequently reassembling the content items 714 into the original content item 320. Finally, in step 920, transmitter 118 may utilize transmit module 216 to perform a content burst transmission of the content items 714 over respective corresponding ones of the available transmission channels 718. The FIG. 9 burst transmission procedure may then terminate.

Figure 10:
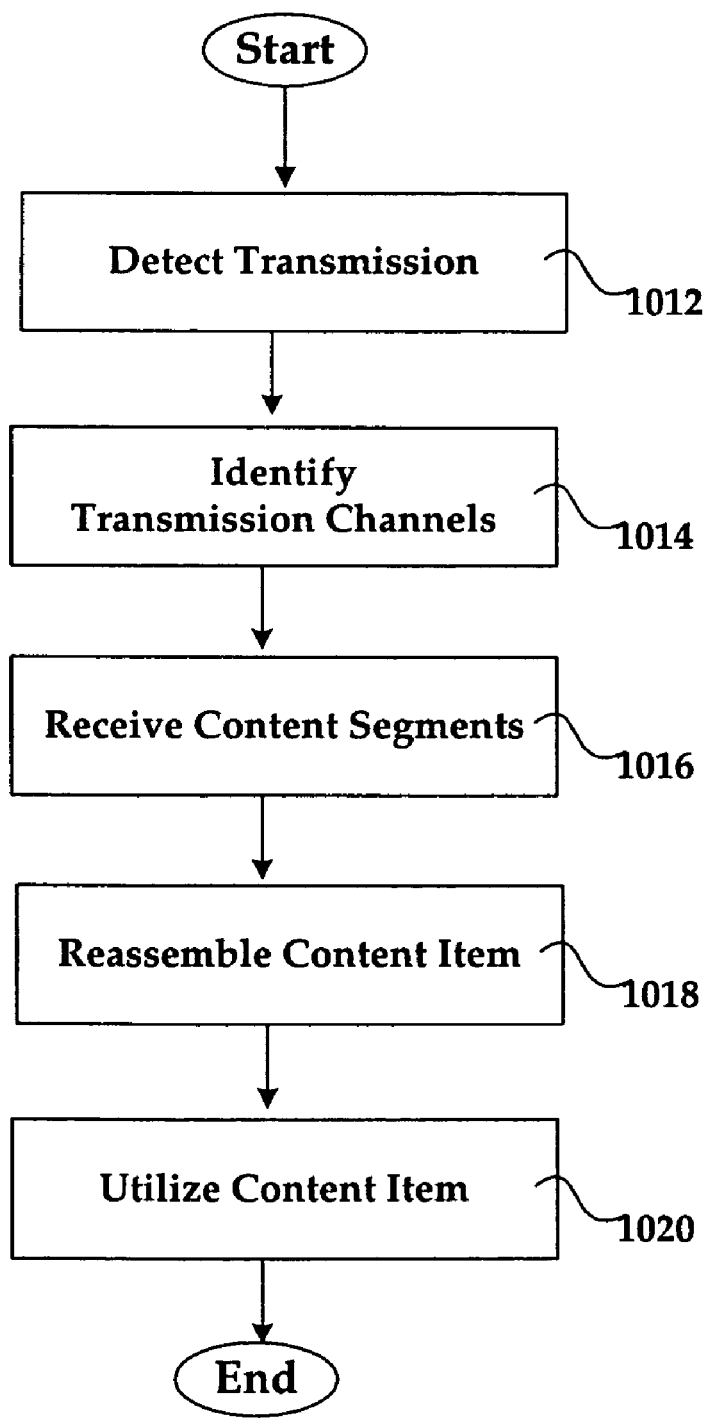
FIG. 10 is a flowchart of method steps for performing a burst reception procedure, in accordance with one embodiment of the present invention.

Referring now to FIG. 10, a flowchart of method steps for performing a burst reception procedure is shown, in accordance with one embodiment of the present invention. The FIG. 10 flowchart is presented for purposes of illustration, and in alternate embodiments, the present invention may utilize steps and sequences other than those steps and sequences discussed in conjunction with the FIG. 10 embodiment.

In the FIG. 10 embodiment, in step 1012, an electronic device 126 utilizes a receiver 514 to detect a content burst transmission from a transmitter 118, as discussed above in conjunction with FIG. 9. In step 1014, a content manager 616 of the electronic device 126 analyzes content transmission information on a primary transmission channel to identify which transmission channels 718 are currently being utilized for performing the content burst transmission procedure.

In step 1016, the receiver 514 receives and locally stores transmitted content segments 714 from the content burst transmission. In step 1018, content manager 616 analyzes the received content segments 714 and performs a content reassembly procedure to produce a unified content item 618 that corresponds to the original content item 320 that was selected for the content burst transmission procedure. Finally, in step 1020, a device user may utilize electronic device 126 to reproduce reassembled content item 618.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting a burst transmission procedure, comprising:
   a burst manager that divides a content item into content segments;
   a transmitter that wirelessly transmits said content segments in a substantially concurrent manner, said transmitter utilizing a plurality of transmission channels to simultaneously transmit respective corresponding ones of said content segments during said burst transmission procedure;
   an electronic device that receives said content segments; and
   a content manager of said electronic device that performs a reassembly procedure to convert said content segments back into said content item.

2. The system of claim 1 wherein said electronic device is implemented as a portable wireless device.

3. The system of claim 1 wherein said content items comprise time-depending data including movies, television programming, music, and audio/video data.

4. The system of claim 1 wherein said transmitter is implemented as a high-power radio-frequency television broadcasting transmitter.

5. The system of claim 1 wherein said burst transmission procedure utilizes substantially all available transmission capacity of said transmitter when transmitting said content segments.

6. The system of claim 1 wherein said electronic device is able to enter a power-saving mode after receiving said content segments through said burst transmission procedure.

7. The system of claim 1 wherein a total number of said content segments equals a total number of said transmission channels.

8. The system of claim 1 wherein said transmission channels include a primary transmission channel that include transmission control information for said burst transmission procedure.

9. The system of claim 1 wherein said electronic device includes a receiver that determines which of said transmission channels are utilized to send said content segments.

10. The system of claim 9 wherein said receiver analyzes transmission control information on a primary transmission channel to identify currently-utilized ones of said transmission channels.

11. The system of claim 1 wherein said burst manager identifies said content item according to predetermined selection criteria.

12. The system of claim 11 wherein said predetermined selection criteria include a content programming schedule.

13. The system of claim 12 wherein said burst manager determines currently available ones of said transmission channels for performing said burst transmission procedure, said burst manager then dividing said content item into a number of said content segments that equals said available ones of said transmission channels.

14. The system of claim 13 wherein said burst manager attaches a separate segment header to each of said content segments, said transmitter then transmitting said content segments.

15. The system of claim 14 wherein a receiver of said electronic device detects said burst transmission procedure, said receiver identifying active ones of said transmission channels by analyzing control information on a primary one of said transmission channels, said receiver then receiving and locally storing said content segments.

16. The system of claim 15 wherein a content manager of said electronic device performs a content reassembly procedure by utilizing segment information from said segment headers to convert said content segments back into said content item.

17. The system of claim 15 wherein said receiver detects a channel change event for said burst transmission procedure by analyzing said control information on said primary one of said transmission channels.

18. A method for supporting a burst transmission procedure, comprising:
dividing a content item into content segments with a burst manager;
utilizing a transmitter to wirelessly transmit said content segments in a substantially concurrent manner, said transmitter utilizing a plurality of transmission channels to simultaneously transmit respective corresponding ones of said content segments during said burst transmission procedure;
receiving said content segments with an electronic device; and
performing a reassembly procedure with a content manager of said electronic device to convert said content segments back into said content item.

* * * * *